US008688132B2

(12) United States Patent
Lindoff et al.

(10) Patent No.: US 8,688,132 B2
(45) Date of Patent: Apr. 1, 2014

(54) SENSING WIRELESS TRANSMISSIONS FROM A LICENSED USER OF A LICENSED SPECTRAL RESOURCE

(75) Inventors: Bengt Lindoff, Bjarred (SE); Thomas Olsson, Karlshamn (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 645 days.

(21) Appl. No.: 12/554,937

(22) Filed: Sep. 7, 2009

(65) Prior Publication Data
US 2011/0059747 A1    Mar. 10, 2011

(51) Int. Cl.
| H04W 40/00 | (2009.01) |
| H04W 72/00 | (2009.01) |
| H04W 24/00 | (2009.01) |
| H04W 4/00 | (2009.01) |
| H04B 7/00 | (2006.01) |
| H04J 1/16 | (2006.01) |
| H04L 12/28 | (2006.01) |
| H04L 12/413 | (2006.01) |

(52) U.S. Cl.
USPC ............. 455/448; 455/452.1; 455/456.1; 455/464; 455/509; 370/252; 370/329; 370/431; 370/445

(58) Field of Classification Search
USPC ........... 455/456.1–456.6, 464, 509, 418–420, 455/448–454, 48; 370/252, 329, 431, 445
See application file for complete search history.

(56) References Cited

U.S. PATENT DOCUMENTS

| 6,223,031 | B1 | 4/2001 | Naslund |
| 6,549,780 | B2 | 4/2003 | Schiff et al. |
| 6,615,044 | B2 | 9/2003 | Tigerstedt et al. |
| 7,006,838 | B2 | 2/2006 | Diener et al. |
| 7,136,638 | B2 | 11/2006 | Wacker et al. |
| 7,447,482 | B2 | 11/2008 | Hirata |
| 7,502,341 | B2 | 3/2009 | Matoba et al. |
| 2004/0042411 | A1 | 3/2004 | Dahlback et al. |

(Continued)

FOREIGN PATENT DOCUMENTS

WO    2009/069069 A2    6/2009

OTHER PUBLICATIONS

Texas Instruments "The Effects of Adjacent Channel Rejection and Adjacent Channel Interference on 802.11 WLAN Performance" SPLY005, Nov. 2003 White Paper.

(Continued)

*Primary Examiner* — Vladimir Magloire
*Assistant Examiner* — Michael Mapa
(74) *Attorney, Agent, or Firm* — Potomac Patent Group PLLC; Kenneth B. Leffler

(57) ABSTRACT

Sensing wireless transmissions from a licensed user of a licensed spectral resource includes obtaining information indicating a number of adjacent sensors that are concurrently sensing wireless transmissions from the licensed user of the licensed spectral resource. Such information can be obtained from a main node controlling the sensor and its adjacent sensors, or by the sensor itself (e.g., by means of short-range communication equipment targeting any such adjacent sensors). A sensing rate is then determined as a function, at least in part, of the information indicating the number of adjacent sensors that are concurrently sensing wireless transmissions from the licensed user of the licensed spectral resource. Receiver equipment is then periodically operated at the determined sensing rate, wherein the receiver equipment is configured to detect wireless transmissions from the licensed user of the licensed spectral resource.

20 Claims, 4 Drawing Sheets

(56) References Cited

U.S. PATENT DOCUMENTS

| | | |
|---|---|---|
| 2005/0003828 A1 | 1/2005 | Sugar et al. |
| 2006/0135076 A1 | 6/2006 | Honkanen et al. |
| 2006/0234702 A1 | 10/2006 | Wiberg et al. |
| 2007/0104174 A1 | 5/2007 | Nystrom et al. |
| 2007/0129096 A1 | 6/2007 | Okumura et al. |
| 2008/0146231 A1 | 6/2008 | Huang et al. |
| 2008/0233991 A1 | 9/2008 | Gillig et al. |
| 2009/0005029 A1 | 1/2009 | Wang et al. |
| 2009/0054055 A1 | 2/2009 | Iwamura et al. |
| 2009/0059877 A1 | 3/2009 | Utsunomiya et al. |
| 2009/0109939 A1 | 4/2009 | Bhushan et al. |
| 2009/0186646 A1* | 7/2009 | Ahn et al. ............ 455/509 |
| 2009/0247201 A1* | 10/2009 | Ye et al. ............ 455/509 |
| 2009/0252178 A1 | 10/2009 | Huttunen et al. |
| 2010/0003922 A1* | 1/2010 | Zhou et al. ............ 455/67.11 |
| 2010/0246442 A1* | 9/2010 | Wang et al. ............ 370/254 |
| 2012/0129462 A1* | 5/2012 | Pihlaja et al. ............ 455/67.11 |

OTHER PUBLICATIONS

PCT International Search Report, mailed Jan. 5, 2011, in connection with International Application No. PCT/EP2010/063101, all pages.

* cited by examiner

SENSING WIRELESS TRANSMISSIONS FROM A LICENSED USER OF A LICENSED SPECTRAL RESOURCE

BACKGROUND

The present invention relates to wireless communications, and more particularly to the sensing of wireless transmissions from a licensed user of a licensed spectral resource.

The radio spectrum is a limited resource that should be shared between many different types of equipment such as cellular, home network, broadcast, and military communication equipment. Historically, each part of the radio spectrum has been allocated to a certain use (called a "licensed" and/or "primary" use). This strategy has resulted in all applications/uses being disallowed on the allocated carrier frequency except for those applications included in the license agreement. In practice, this results in large parts of the radio spectrum being unused much of the time. For instance, in the Ultra-High Frequency (UHF) band, where TV broadcasts take place, large geographical areas are unused, mainly due to the large output power needed for such applications; this large output power compels a large reuse distance in order to minimize the risk of interference. An example of such geographical areas within Scandinavia is illustrated in FIG. 1. In FIG. 1, the shaded areas represent geographic locations in which a given carrier frequency is being used by a licensed user (e.g., by Broadcast TV). In the remaining areas, the so-called "white spaces", the given carrier frequency is allocated to the licensed user but is not actually being used by that user.

In order to make better use of the licensed spectral resources, some countries will, in the future, allow unlicensed services (so called "secondary" uses) to take place in areas (called "white spaces") in which the licensed (primary) user is not transmitting. However the primary user will always have priority for the use of the spectrum to the exclusion of others. Therefore, some kind of sensing mechanism is needed in the (unlicensed) devices to enable them to detect whether a licensed user is currently transmitting. If such licensed use is occurring, the unlicensed user needs to turn off its transmission on that carrier frequency. The most straightforward sensor is a signature detector adapted to detect specific signatures transmitted from the licensed/primary user (typically implemented as a matched filer).

Another consideration regarding the sensing of the licensed user's transmissions is placement of the sensors. When the secondary (i.e., unlicensed) use is for cellular telecommunications, one solution is to include the sensors in the base station of the mobile communication system. However due to shadow fading and the like, there is a risk that the base station will not detect the primary user's transmissions despite the fact that a mobile device/terminal (generally referred to as "user equipment"—"UE") (connected to base station) is (or is capable of) interfering with the licensed user. One way to combat this problem is to include a sensing device in all UEs operating on these white space carriers; that is, all UEs can detect licensed use of the spectral resources and respond by turning off their own unlicensed transmissions. A main problem with sensing is that there are requirements to detect a licensed user's activity rather quickly, implying that sensing needs to be performed quite frequently. Since sensing typically includes reception and decoding of a radio signal, the more frequently a UE performs detection, the more power it consumes. This is an undesirable consequence, especially for battery-operated devices.

Therefore, there is a need for systems capable of operating in white spaces in an efficient manner that seeks to reduce the cost (in terms of energy and otherwise) and complexity involved in such unlicensed operation, while still having good performance in connection with detection of potential transmissions of the primary user.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that sense wireless transmissions from a licensed user of a licensed spectral resource. Such operation includes obtaining information indicating a number of adjacent sensors that are concurrently sensing wireless transmissions from the licensed user of the licensed spectral resource. A sensing rate is determined as a function, at least in part, of the information indicating the number of adjacent sensors that are concurrently sensing wireless transmissions from the licensed user of the licensed spectral resource. Receiver equipment is then periodically operated at the determined sensing rate, wherein the receiver equipment is configured to detect, as part of a sensing operation, wireless transmissions from the licensed user of the licensed spectral resource.

In some embodiments, various aspects are performed by a user equipment in a mobile communication system that is not licensed to use the licensed spectral resource. In such embodiments, the information indicating the number of adjacent sensors that are concurrently sensing wireless transmissions from the licensed user of the licensed spectral resource is information indicating the number of adjacent sensors that are concurrently sensing wireless transmissions from the licensed user of the licensed spectral resource and located within a predefined distance from the user equipment. Also in such (i.e., mobile communication system) embodiments, obtaining the information indicating the number of adjacent sensors that are concurrently sensing wireless transmissions from the licensed user of the licensed spectral resource comprises the user equipment receiving, from a base station operating in the mobile communication system, the information indicating the number of adjacent sensors that are concurrently sensing wireless transmissions from the licensed user of the licensed spectral resource. Alternatively, obtaining the information indicating the number of adjacent sensors that are concurrently sensing wireless transmissions from the licensed user of the licensed spectral resource comprises the user equipment itself performing a short range communication process to ascertain the information indicating the number of adjacent sensors that are concurrently sensing wireless transmissions from the licensed user of the licensed spectral resource.

In another aspect of embodiments consistent with the invention, the higher the number of adjacent sensors, the lower the sensing rate.

In still another aspect, each sensing operation extends over a duration of time, and sensing wireless transmissions from a licensed user of a licensed spectral resource involves determining each sensing operation duration of time as a function, at least in part, of one or more indicators of licensed spectral resource quality. For example, a relationship can be used wherein the higher the licensed spectral resource quality, the shorter each sensing operation's duration of time.

The one or more indicators of licensed spectral resource quality can include an indicator of a signal to interference ratio or an indicator of a signal strength level.

In yet another aspect, the receiver equipment is configured to detect one or more known signatures included in the wireless transmissions from the licensed user of the licensed spectral resource.

In still another aspect, the various operations are performed by a user equipment in a mobile communication system that is not licensed to use the licensed spectral resource; and the user equipment initiates performance of the method in response to a sensing order received from a base station operating in the mobile communication system. The sensing order can include a frequency and a bandwidth to be sensed by the user equipment. In some embodiments, the sensing order further includes a minimum signal level that serves as a threshold above which the licensed user is considered to be transmitting the wireless transmissions by means of the licensed spectral resource.

BRIEF DESCRIPTION OF THE DRAWINGS

The objects and advantages of the invention will be understood by reading the following detailed description in conjunction with the drawings in which.

DETAILED DESCRIPTION

Figure 1:
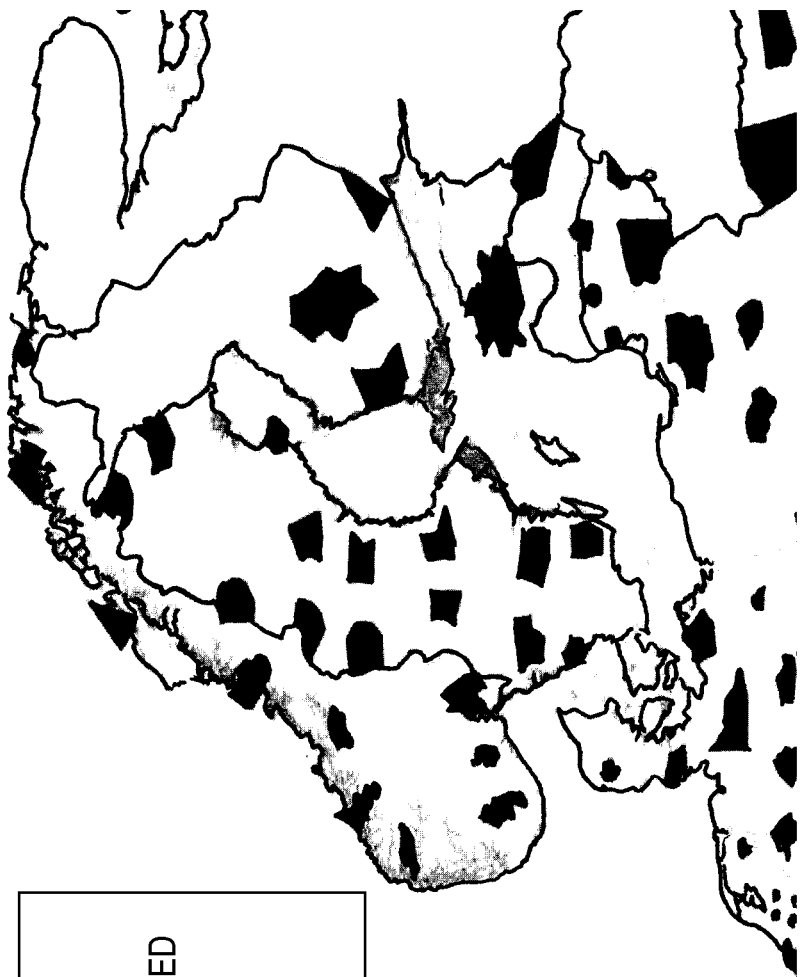
FIG. 1 illustrates geographical areas constituting so-called "white spaces" located in Scandinavia.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a UE (e.g., at a self-determined time or in response to an order from a main node such as a base station) performs sensing on a certain frequency band, with the sensing rate and/or length of each sensing operation being optimized based on (a) the number of adjacent sensors and/or (b) the current radio conditions.

The number of adjacent sensors is, in some embodiments, the number of sensors that are geographically located within a predetermined vicinity of the UE. In some embodiments, this information is determined by the main node (e.g., the base station) and is supplied to the UE. Alternatively, the UE can itself determine the number of adjacent sensors by means of short range communication (scanning) of the surroundings to see whether there are any devices doing sensing in the current frequency band. The more sensors in the vicinity, the less the UE needs to sense its surroundings due to the statistical multiplexing of many devices doing the same thing.

Similarly the better the radio conditions, the shorter the duration of time required for the sensing operation. This is because fewer samples are needed to detect a potential presence of a licensed user's signals.

Various embodiments are therefore able to optimize the sensing time based on current conditions and hence power can be saved in the UE.

These and other aspects will now be described in further detail.

Figure 2:
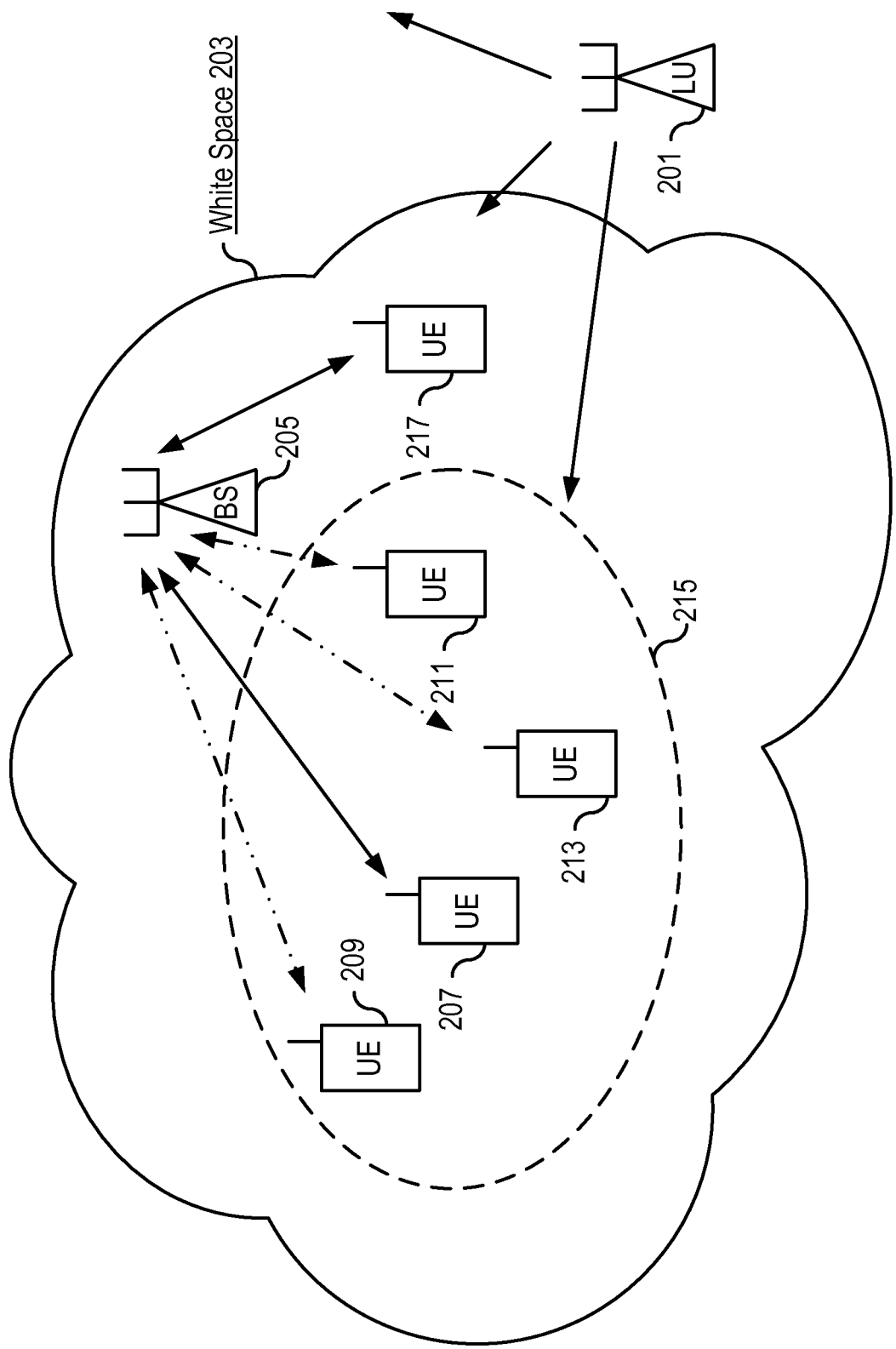
FIG. 2 is a block diagram of an exemplary system capable of carrying out various aspects of the invention.
Figure 3:
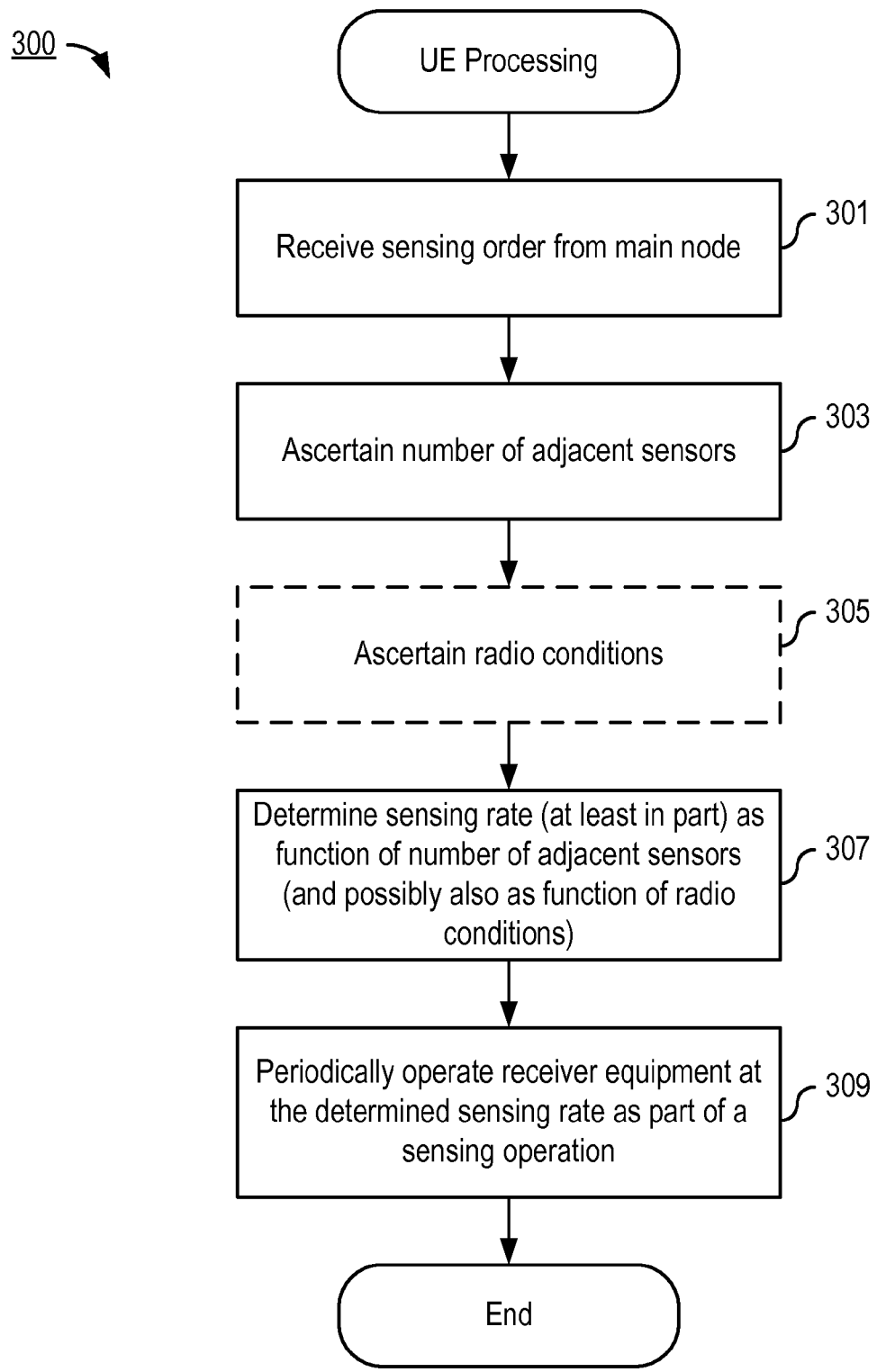
FIG. 3 is, in one respect, a flow chart of steps/processes/functions, carried out by an exemplary UE consistent with the invention.

Beginning first with FIGS. 2 and 3, FIG. 2 is a block diagram of an exemplary system capable of carrying out various aspects of the invention and FIG. 3 is, in one respect, a flow chart of steps/processes/functions, carried out by an exemplary UE consistent with the invention. In another respect, FIG. 3 can be considered to depict the various elements of logic 300 configured to carry out the various functions described in FIG. 3 and its supporting text.

In FIG. 2, a licensed user (LU) 201 is depicted operating within a geographic area that includes a white space 203. A mobile communication system is configured in accordance with various aspects of the invention to permit it to operate as an unlicensed user within the white space 203. The mobile communication system includes a base station 205 that serves one or more UEs, including a UE 207. In the context of the invention, the base station 205 exemplifies a "main node." In other embodiments different equipment constitutes the "main node." For example, in WLAN systems, a router can operate as a main node in the context of the invention.

The UE 207 includes circuitry configured to periodically sense whether the licensed user 201 is transmitting within the white space 203, and moreover to adapt its sensing rate as a function, at least in part, of information indicating the number of adjacent sensors that are concurrently sensing wireless transmissions from the licensed user of the licensed spectral resource. In FIG. 2, UEs 209, 211, and 213 exemplify adjacent sensors. For example, a UE, sensing transmissions from the licensed user 201 concurrently with the UE 207's sensing operations, can be considered to be "adjacent" to the UE 207 if it is within a predefined distance (e.g., as measured in meters) from the UE 207. Another UE 217 is not within the predefined distance from the UE 207, and is therefore not considered to be one of the UE 207's adjacent sensors.

Referring now to FIG. 3, the UE 207 is connected to the base station 205 (main node) and is ordered by the base station 205 to perform sensing at a certain carrier frequency for a signal having a certain bandwidth (BW) (step 301). The sensing order can further include a minimum signal level that the UE 207 (or the circuitry 300 included within a UE consistent with embodiments of the invention) that the UE 207 will use as a threshold above which a detected signal is considered to be a transmission from the licensed user; below this threshold, the UE's operation is not considered to interfere with a licensed user. The sensing that the UE is ordered to perform can be at the same carrier frequency and bandwidth as a signal that it receives from/transmits to the base station 205, but this is not a requirement.

In response to the sensing order, the UE 207 ascertains the number of adjacent sensors that are concurrently sensing the same carrier (step 303). This information can be obtained in several ways. In some embodiments, for example, the base station 205 (main node) supplies this information to the UE 207. The base station 205 is able to put together this information by means of its knowledge of the geo-location of the UE 207 and knowledge of other geo-locations of other UEs that are also scanning the same carrier frequency and bandwidth. It is then just a matter of communicating the information to the UE 207.

In alternative embodiments, the UE 207 obtains information about the number of adjacent sensors by scanning of its vicinity by means of some kind of short range communication (e.g., Bluetooth® communication equipment, WLAN equipment, etc.).

In another aspect of some (but not all) embodiments consistent with the invention, the UE 207 also ascertains current radio conditions (e.g., signal strength, Signal-to-Interference Ratio—"SIR"—, etc.) in its vicinity (step 305, depicted in dashed lines in FIG. 3 to represent the optional nature of this feature). The current radio conditions can be assessed from, for example, pilot symbols transmitted by the main node. Radio condition assessment techniques are known in the art, and need not be described here in detail.

Once the UE 207 obtains information about the number of adjacent sensors, and in some embodiments also information about current radio conditions, it determines a sensing rate at least in part as a function of the number of adjacent sensors (step 307). Typically, the more adjacent sensors there are, the longer the duty cycle for the UE's sensing procedure. In those embodiments that include ascertaining current radio conditions, the UE 207 further adapts its sensing scheme based on current radio conditions: the better the radio conditions, the shorter the duration of the sensing operation (i.e., the shorter the sensing "snap shot").

Having determined a sensing scheme (including rate) based on current conditions, the UE then periodically operates its receiver equipment at the determined sensing rate to detect signals from a licensed user as part of performing the sensing operation (step 309). The main node is informed if a signal of a licensed user is detected in the frequency band, so that suitable steps can be taken in response in order to avoid causing interference to the licensed user. The sensing is continued until the main node orders that something else be done.

Figure 4:
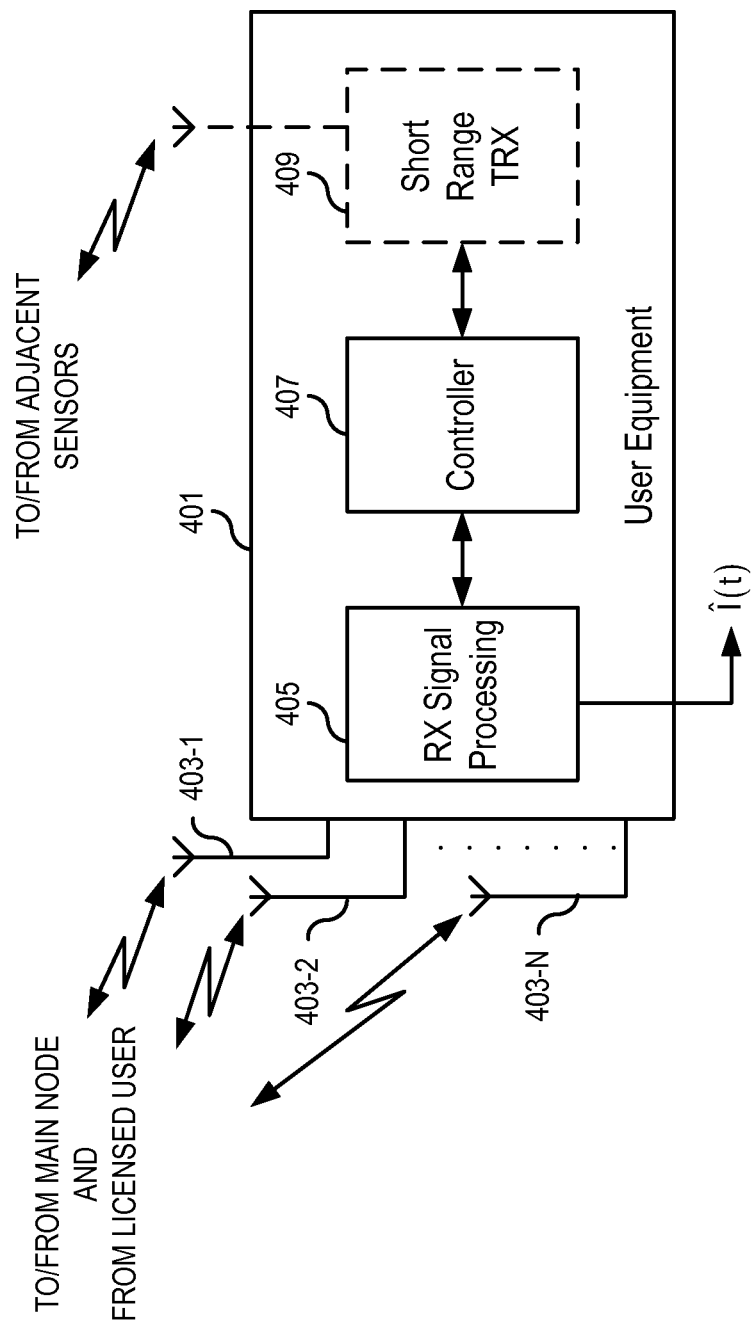
FIG. 4 is a block diagram of a UE adapted with circuitry configured to carry out the various aspects of the invention.

FIG. 4 is a block diagram of a UE 401 adapted with circuitry configured to carry out the various aspects of the invention. For the sake of clarity, only those components having particular relevance to the invention are depicted. Those of ordinary skill in the art will readily understand that the UE 401 also includes other circuitry (not depicted) that is well-known in the art and therefore need not be described herein.

In this example, the UE 401 employs so-called multiple-input, multiple-output (MIMO) communication technology. MIMO systems employ multiple antennas at the transmitter and receiver (e.g., the UE's antennas 403-1, 403-2, . . . , 403-N) to transmit and receive information. The receiver can exploit the spatial dimensions of the signal at the receiver to achieve higher spectral efficiency and higher data rates without increasing bandwidth. However, the use of MIMO communication technology is by no means essential the invention; in alternative embodiments, the UE 401 could employ just a single antenna.

The base station (main node) (not shown) communicates with the UE 401 via a multipath channel. In downlink transmissions, an information signal, I (t), (e.g., in the form of a binary data stream) is supplied to the base station, which applies such processes as error coding, mapping the input bits to complex modulation symbols, and generating transmit signals for each of one or more transmit antennas. After upward frequency conversion, filtering, and amplification, the base station transmits the transmit signals from its one or more transmit antennas the channel to the UE 401.

Receiver equipment in the UE 401 demodulates and decodes the signal received at each of its antennas 403-1, 403-2, . . . , 403-N. The UE 401 includes a controller 407 for controlling operation of various UE components, including receiver signal processing circuitry 405. The receive signal processing circuitry 405 demodulates and decodes the signal transmitted from the base station. In the absence of bit errors, the output signal from the UE 401, Î (t), will be the same as the original information signal I (t).

The controller 407 is further configured to cause the UE 401 to carry out processes such as those exemplified by FIG. 3. In those embodiments in which the UE 401 itself determines the information about the number of adjacent sensors that are concurrently sensing wireless transmissions from the licensed user of the licensed spectral resource, the UE 401 can include short range transceiver (TRX) equipment 409. As described earlier, the short range TRX equipment 409 can operate in accordance with any of a number of known short range communication technologies, such as Bluetooth® communication equipment, WLAN equipment, and the like.

Various embodiments of the invention are able to improve upon unlicensed operation of communication equipment in an area allocated for use by a licensed user in that the UE's sensing operations (i.e., to determine whether the licensed user is presently using licensed spectral resources) are performed:

at a rate proportional to the need for sensing;
in frequency bands in which sensing is needed;
at an appropriate receiver sensitivity.

The UE is therefore able to save energy by reducing the sensing need and sensing power consumption most of the time.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of sensing wireless transmissions from a licensed user of a licensed spectral resource, the method comprising:
   obtaining information indicating a number of adjacent sensors that are concurrently sensing wireless transmissions from the licensed user of the licensed spectral resource;
   determining a sensing rate as a function only of the information indicating the number of adjacent sensors that are concurrently sensing wireless transmissions from the licensed user of the licensed spectral resource;

periodically operating receiver equipment at the determined sensing rate, wherein the receiver equipment is configured to detect, as part of a sensing operation, wireless transmissions from the licensed user of the licensed spectral resource.

2. The method of claim 1, wherein:
the method is performed by a user equipment in a mobile communication system that is not licensed to use the licensed spectral resource; and
obtaining the information indicating the number of adjacent sensors that are concurrently sensing wireless transmissions from the licensed user of the licensed spectral resource comprises the user equipment receiving, from a base station operating in the mobile communication system, the information indicating the number of adjacent sensors that are concurrently sensing wireless transmissions from the licensed user of the licensed spectral resource.

3. The method of claim 1, wherein:
the method is performed by a user equipment in a mobile communication system that is not licensed to use the licensed spectral resource; and
obtaining the information indicating the number of adjacent sensors that are concurrently sensing wireless transmissions from the licensed user of the licensed spectral resource comprises the user equipment itself performing a short range communication process to ascertain the information indicating the number of adjacent sensors that are concurrently sensing wireless transmissions from the licensed user of the licensed spectral resource.

4. The method of claim 1, wherein the higher the number of adjacent sensors, the lower the sensing rate.

5. The method of claim 1, wherein the receiver equipment is configured to detect one or more known signatures included in the wireless transmissions from the licensed user of the licensed spectral resource.

6. The method of claim 1, wherein:
the method is performed by a user equipment in a mobile communication system that is not licensed to use the licensed spectral resource; and
the user equipment initiates performance of the method in response to a sensing order received from a base station operating in the mobile communication system.

7. The method of claim 6, wherein the sensing order includes a frequency and a bandwidth to be sensed by the user equipment.

8. The method of claim 7, wherein the sensing order further includes a minimum signal level that serves as a threshold above which the licensed user is considered to be transmitting the wireless transmissions by means of the licensed spectral resource.

9. The method of claim 1, wherein:
the method is performed by a user equipment in a mobile communication system that is not licensed to use the licensed spectral resource; and
the information indicating the number of adjacent sensors that are concurrently sensing wireless transmissions from the licensed user of the licensed spectral resource is information indicating the number of adjacent sensors that are concurrently sensing wireless transmissions from the licensed user of the licensed spectral resource and located within a predefined distance from the user equipment.

10. The method of claim 1, wherein:
the method is performed by a user equipment in a mobile communication system that is not licensed to use the licensed spectral resource; and
the method comprises contributing to a statistically multiplexed scanning result by informing a base station operating in the mobile communication system whenever a wireless transmission from the licensed user of the licensed spectral resource has been detected.

11. An apparatus for sensing wireless transmissions from a licensed user of a licensed spectral resource, the apparatus comprising:
circuitry configured to obtain information indicating a number of adjacent sensors that are concurrently sensing wireless transmissions from the licensed user of the licensed spectral resource;
circuitry configured to determine a sensing rate as a function only of the information indicating the number of adjacent sensors that are concurrently sensing wireless transmissions from the licensed user of the licensed spectral resource;
circuitry configured to periodically operate receiver equipment at the determined sensing rate, wherein the receiver equipment is configured to detect, as part of a sensing operation, wireless transmissions from the licensed user of the licensed spectral resource.

12. The apparatus of claim 11, wherein:
the apparatus is configured to operate as part of a user equipment in a mobile communication system that is not licensed to use the licensed spectral resource; and
the circuitry configured to obtain the information indicating the number of adjacent sensors that are concurrently sensing wireless transmissions from the licensed user of the licensed spectral resource comprises circuitry configured to receive, from a base station operating in the mobile communication system, the information indicating the number of adjacent sensors that are concurrently sensing wireless transmissions from the licensed user of the licensed spectral resource.

13. The apparatus of claim 11, wherein:
the apparatus is configured to operate as part of a user equipment in a mobile communication system that is not licensed to use the licensed spectral resource; and
the circuitry configured to obtain the information indicating the number of adjacent sensors that are concurrently sensing wireless transmissions from the licensed user of the licensed spectral resource comprises short range communication circuitry configured to ascertain the information indicating the number of adjacent sensors that are concurrently sensing wireless transmissions from the licensed user of the licensed spectral resource.

14. The apparatus of claim 11, wherein the higher the number of adjacent sensors, the lower the sensing rate.

15. The apparatus of claim 11, wherein the receiver equipment is configured to detect one or more known signatures included in the wireless transmissions from the licensed user of the licensed spectral resource.

16. The apparatus of claim 11, wherein:
the apparatus is configured to operate as part of a user equipment in a mobile communication system that is not licensed to use the licensed spectral resource; and
the apparatus is configured to begin activation in response to a sensing order received from a base station operating in the mobile communication system.

17. The apparatus of claim 16, wherein the sensing order includes a frequency and a bandwidth to be sensed by the user equipment.

18. The apparatus of claim 17, wherein the sensing order further includes a minimum signal level that serves as a threshold above which the licensed user is considered to be transmitting the wireless transmissions by means of the licensed spectral resource.

19. The apparatus of claim 11, wherein:
the apparatus is configured to operate as part of a user equipment in a mobile communication system that is not licensed to use the licensed spectral resource; and
the information indicating the number of adjacent sensors that are concurrently sensing wireless transmissions from the licensed user of the licensed spectral resource is information indicating the number of adjacent sensors that are concurrently sensing wireless transmissions from the licensed user of the licensed spectral resource and located within a predefined distance from the user equipment.

20. The apparatus of claim 11, wherein:
the apparatus is configured to operate as part of a user equipment in a mobile communication system that is not licensed to use the licensed spectral resource; and
the apparatus is configured to contribute to a statistically multiplexed scanning result by informing a base station operating in the mobile communication system whenever a wireless transmission from the licensed user of the licensed spectral resource has been detected.

* * * * *

UNITED STATES PATENT AND TRADEMARK OFFICE
CERTIFICATE OF CORRECTION

PATENT NO.         : 8,688,132 B2
APPLICATION NO.    : 12/554937
DATED              : April 1, 2014
INVENTOR(S)        : Lindoff et al.

It is certified that error appears in the above-identified patent and that said Letters Patent is hereby corrected as shown below:

On the title page, item (75), under "Inventors", in Column 1, Line 1, delete "Bjarred" and insert -- Bjärred --, therefor.

Signed and Sealed this
Fourth Day of October, 2016

Michelle K. Lee
*Director of the United States Patent and Trademark Office*